(12) United States Patent
Hossain

(10) Patent No.: US 6,489,061 B1
(45) Date of Patent: Dec. 3, 2002

(54) SECONDARY NON-AQUENOUS ELECTROCHEMICAL CELL CONFIGURED TO IMPROVE OVERCHARGE AND OVERDISCHARGE ACCEPTANCE ABILITY

(75) Inventor: Sohrab Hossain, Tucson, AZ (US)

(73) Assignee: Litech, L.L.C., Tucson, AZ (US)

( * ) Notice: Subject to any disclaimer, the term of this patent is extended or adjusted under 35 U.S.C. 154(b) by 0 days.

(21) Appl. No.: 09/577,639

(22) Filed: May 24, 2000

(51) Int. Cl.⁷ ................................................. H01M 4/58
(52) U.S. Cl. ................. 429/231.1; 429/231.4; 429/231.8; 429/233; 429/245
(58) Field of Search ........................... 429/231.1, 231.4, 429/231.8, 233, 245

(56) References Cited

U.S. PATENT DOCUMENTS

| | | | |
|---|---|---|---|
| 4,136,213 A | * 1/1979 | Fung et al. | 427/122 |
| 5,028,500 A | 7/1991 | Fong et al. | 429/194 |
| 5,153,082 A | 10/1992 | Ogino | 429/231.4 |
| 5,158,578 A | 10/1992 | Yoshimoto et al. | 29/683.5 |
| 5,443,928 A | * 8/1995 | Takeuchi et al. | 429/231.4 |
| 5,580,538 A | 12/1996 | Bito et al. | 423/447 |
| 5,667,914 A | 9/1997 | Nagamine et al. | 429/194 |
| 5,698,340 A | 12/1997 | Xue et al. | 429/218 |
| 5,834,138 A | 11/1998 | Yamada et al. | 429/194 |
| 6,042,969 A | 3/2000 | Yamada et al. | 429/218.1 |
| 6,228,516 B1 | * 5/2001 | Denton et al. | 429/122 |

FOREIGN PATENT DOCUMENTS

| | | |
|---|---|---|
| EP | 0 803 926 A | 10/1997 |
| WO | WO9624956 | 8/1996 |
| WO | WO 98/47195 | 10/1998 |

OTHER PUBLICATIONS

Patent Abstracts of Japan: Title: Manufacture of Carbon Substrate for Lithium Secondary Battery Negative Electrode, and Negative Electrode for Lithium Secondary Battery. Publication No. 10021916; Publication Date: Jan. 23, 1998 Inventor: Saeki Toru.
Patent Abstracts of Japan: Title: Negative Electrode for Lithium Secondary Battery and Lithium Secondary Battery Using Same Electrode. Publication No.: 05283061; Publication Date: Oct. 29, 1993; Inventor: Mabuchi Akihiro.
Patent Abstracts of Japan: Title: Lithium Secondary Battery. Publication No.: 11250909; Publication Date: Sep. 17, 1999; Inventor: Nishio Koji.
Essentials of Carbon–Carbon Composites, Edited by C. R. Thomas, The Royal Society of Chemistry, Cambridge, 1993 (cover, preface and pp. 1–37).
Carbon–Carbon Composites, by G. Savage, Chapman & Hall, New York, 1993 (cover, preface and pp. 276–323).

* cited by examiner

Primary Examiner—Laura Weiner
(74) Attorney, Agent, or Firm—Lawrence R. Oremland, P.C.

(57) ABSTRACT

The present invention provides a secondary electrochemical cell comprising a body of aprotic, non-aqueous electrolyte, first and second electrodes in effective electrochemical contact with the electrolyte, the first electrode comprising active materials such as a lithiated intercalation compound serving as the positive electrode or cathode and the second electrode comprising a carbon material on carbon-based substrate and serving as the negative electrode or anode; whereby they provide a secondary non-aqueous electrochemical cell having improved overdischarge and overcharge acceptance ability as compared with similar secondary non-aqueous electrochemical cells having carbon anodes with metal substrate.

3 Claims, 4 Drawing Sheets

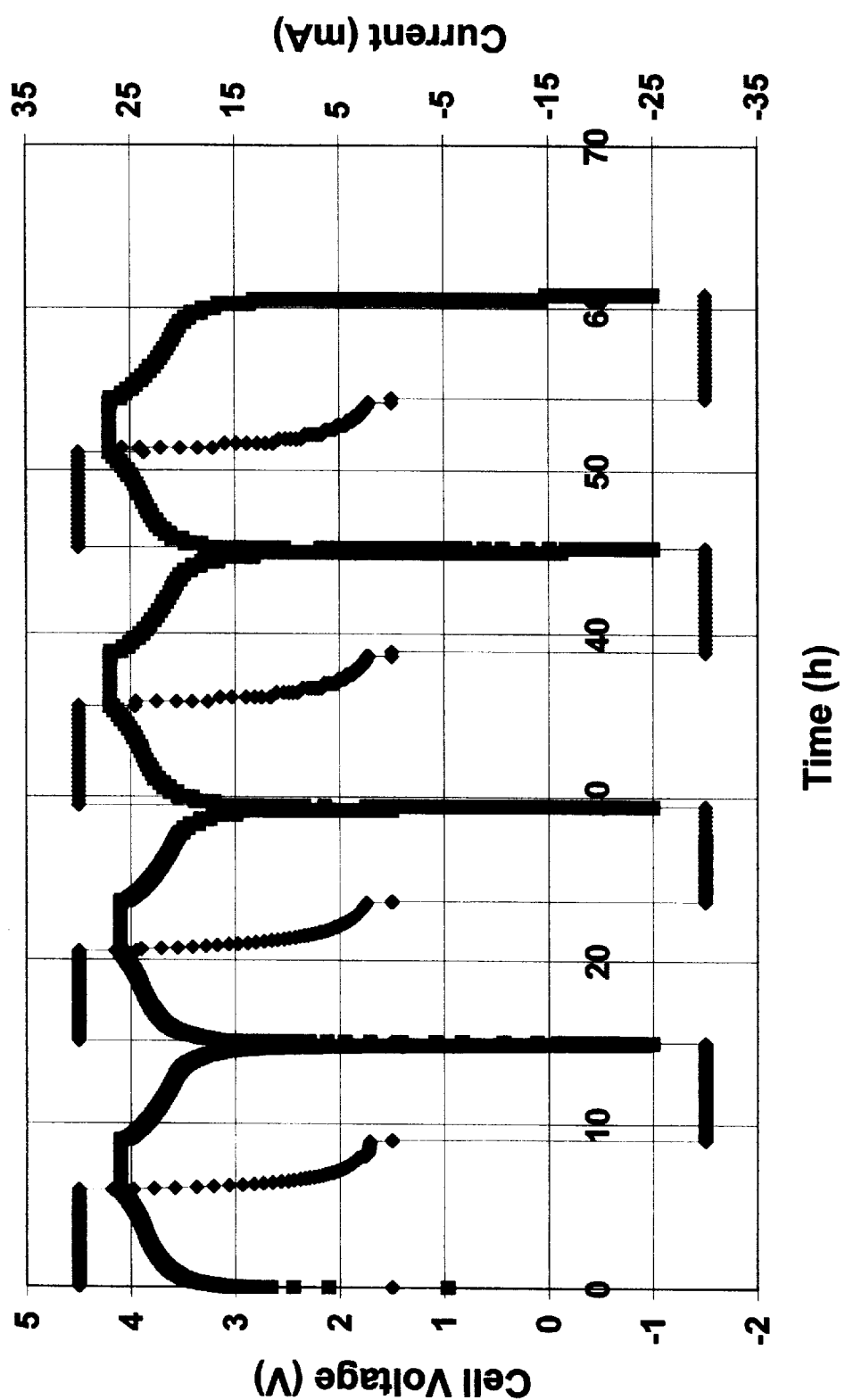
Fig. 1: Charge-Overdischarge Behavior of a Lithium-ion Cell made in accordance with the present invention.

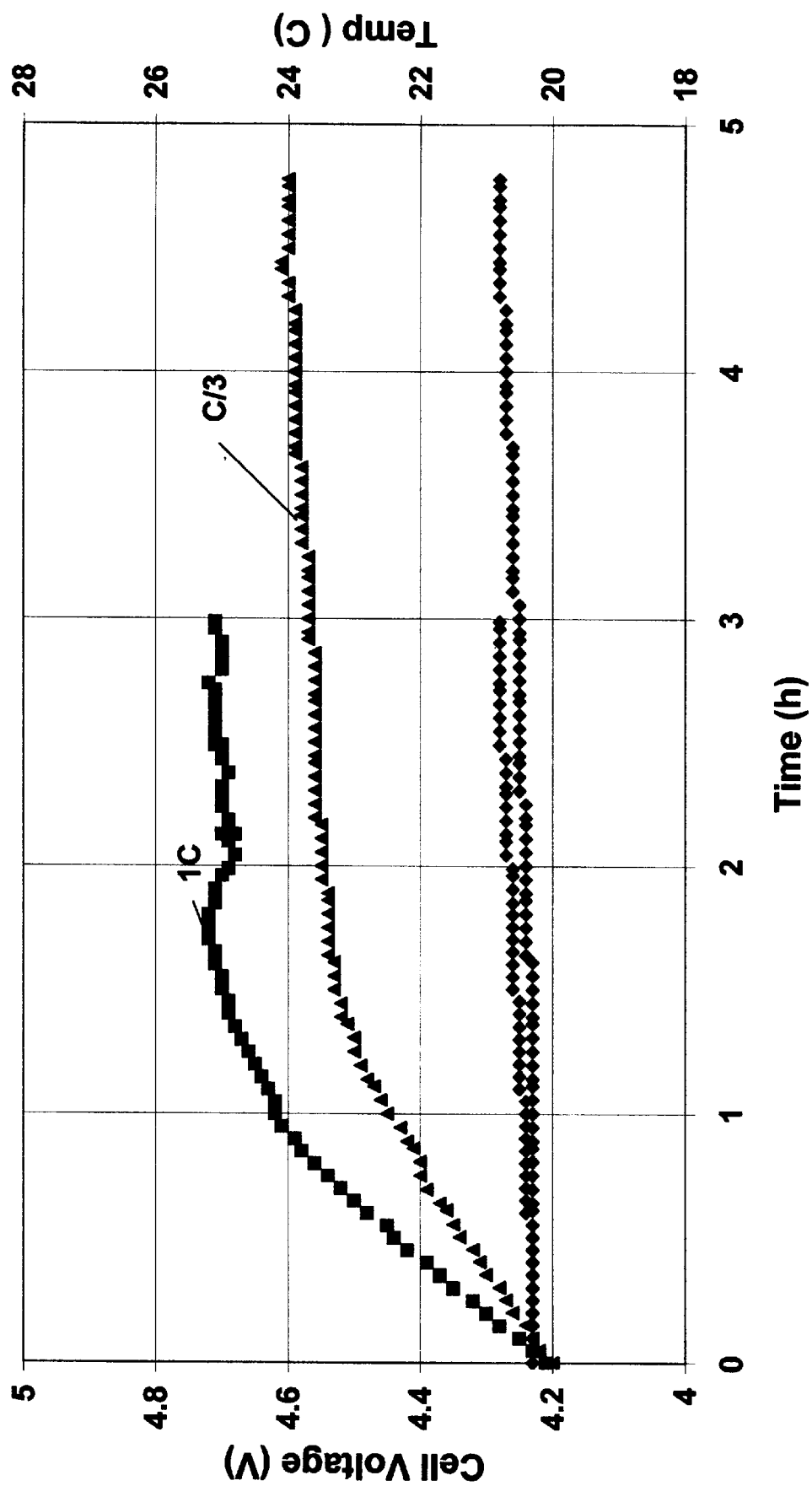
Fig. 2: Voltage-Temperature Response during Overcharge of a Lithium-ion Cell made in accordance with the present invention.

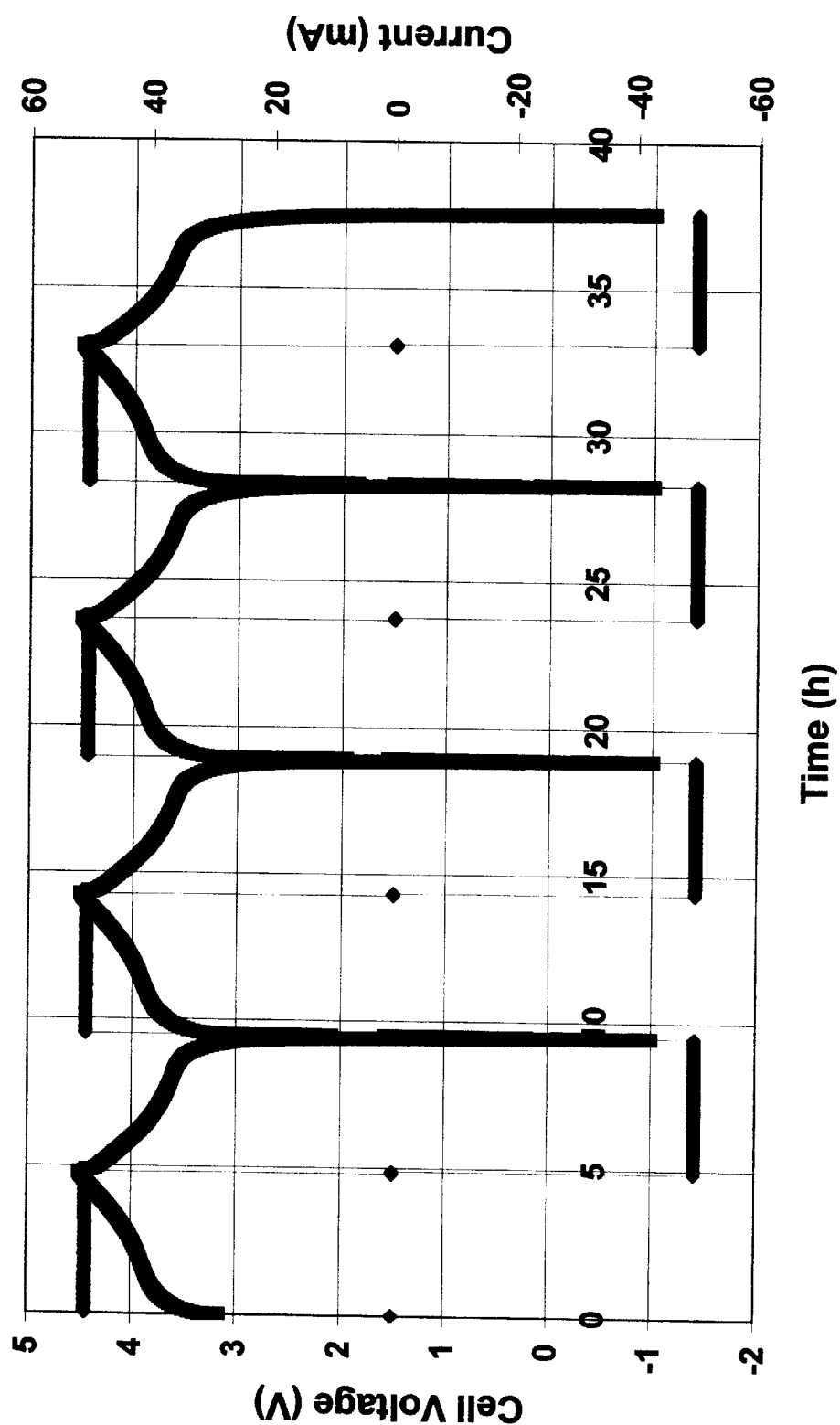
Fig. 3: Repeated Overcharge/Overdischarge Behavior of a Lithium-ion Cell made in accordance with the present invention.

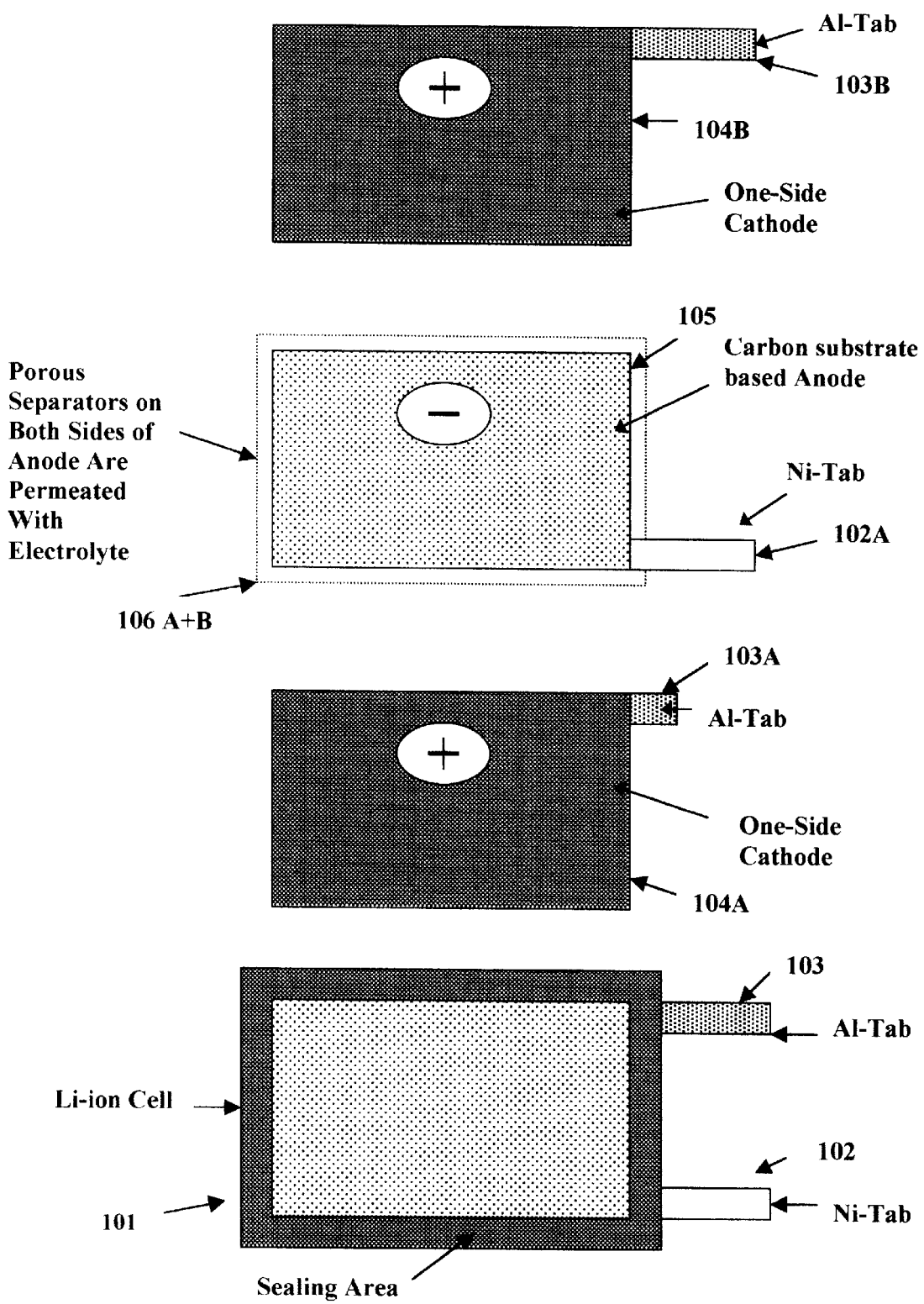
Fig. 4: Schematic Diagram of a Lithium Ion-Cell.

SECONDARY NON-AQUEOUS ELECTROCHEMICAL CELL CONFIGURED TO IMPROVE OVERCHARGE AND OVERDISCHARGE ACCEPTANCE ABILITY

FIELD OF INVENTION

The present invention relates generally to non-aqueous lithium ion secondary electrochemical cells and batteries formed of such cells and, more particularly, to such cells and batteries in which an anode comprising a substrate formed of carbon based material provides the cells and batteries with overcharge and overdischarge acceptance ability.

DESCRIPTION OF THE PRIOR ART

Since its introduction and commercialization in 1991, lithium-ion battery systems have received considerable interest not only to the battery community but also to the to electronic industries. In lithium-ion batteries, carbon or graphite is used as an anode, a lithiated transition metal intercalation compound is used as a cathode and $LiPF_6$ is used as an electrolyte in carbonate-based organic solvents. For example, the reactions at the electrodes and overall cell reaction of an oxide-containing lithium intercalation compound are as follows:

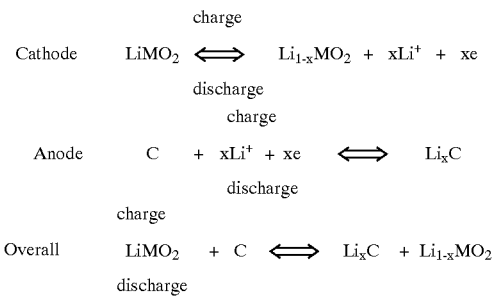

where $LiMO_2$ represents the lithiated metal oxide intercalation compound.

The electrochemical process is the uptake of lithium ions at the anode during charge and their release during discharge, rather than lithium plating and stripping as occurs in metallic lithium rechargeable battery systems. As metallic lithium is not present in the cell, lithium-ion cells have enhanced safety and a longer cycle life than the cells containing metallic lithium. Because of their advantageous characteristics, lithium-ion batteries are widely used for consumer electronics applications such as cellular phones, laptop computers, camcorders, and personal digital assistant.

At present, hard carbon or graphite is used as active anode material in commercial lithium-ion batteries. Polyvinyledene fluoride (PVDF) is used as a binder to improve the mechanical integrity of the electrode. Copper is universally used as the substrate for anode. Hard carbon or graphite material is mixed with PVDF in an organic solvent and the mixture is coated on the copper substrate to produce the anode.

The present state-of-the-art lithium-ion cells require overcharge/overdischarge protection circuits and/or devices so that the cells can charge and discharge within certain voltage regimes. Overdischarge causes dissolution of copper that is used as the substrate for carbon anode and degrades cell performance.

During overcharge, more lithium-ions are transported to the carbon anode and since the anode does not have enough room to accommodate them, overcharge may cause metallic lithium deposition on the anode, heat build-up, and ultimately thermal run away of the cell.

Overcharge/overdischarge protection circuits and/or devices also increase(s) the weight and cost of the lithium-ion cell. Reliable and inexpensive overcharge/overdischarge protection for multi-cell lithium-ion battery is a major obstacle to commercialization of the systems in electric vehicle and other high voltage applications.

OBJECTIVES AND ADVANTAGES OF PRESENT INVENTION

Accordingly, it is the primary objective of the present invention to improve the overcharge/overdischarge acceptance ability of lithium-ion cells and battery systems.

Another objective of the present invention is to provide such overcharge/overdischarge acceptance ability in the anodes of the cells, and thereby eliminate the need for overcharge/overdischarge protection circuits and/or devices, thus reduce the cost and weight of lithium-ion cells.

Still another objective of the present invention is to provide a novel and improved rechargeable lithium-ion cell and battery system that utilizes carbon-based substrate to produce an anode which provides such overcharge/overdischarge acceptance ability.

SUMMARY OF THE INVENTION

Briefly stated, this invention provides a rechargeable electrochemical cell comprising a body of aprotic, non-aqueous electrolyte, first and second electrodes in effective contact with said electrolyte, the first electrode comprising a positive material such as lithiated intercalation compound and the second electrode comprising carbon on carbon-based substrate. In accordance with this invention, commercially available carbon based films of high electronic conductivity are chosen for the substrate, and on which carbon material having high lithium-ion intercalation capacity is coated to produce the negative electrode, i.e., anode of the electrochemical cell. Commercially available carbon-carbon composite of high electronic and thermal conductivity can also be chosen as the anode of the electrochemical cell. The substrate of the carbon-carbon composite anode is carbon and, therefore, the lithium-ion cells made in accordance with the present invention can accept repeated overdischarge without performance degradation.

The anode substrate and anode itself each comprises carbon material, and each can accept lithium-ions during charge from cathode of lithiated intercalation compounds. The substrate can, therefore, act as a sink of lithium-ions. During overcharge, additional lithium-ions from the cathode can, therefore, be stored to the anode substrate without causing metallic lithium deposition.

Thus, the anode made according to the present invention allows the acceptance ability for overcharge and overdischarge of a lithium-ion cell.

BRIEF DESCRIPTION OF THE DRAWINGS AND EXHIBITS

In the accompanying drawings:

FIG. 1 is a graph representing the overdischarge characteristics of a lithium-ion cell made in accordance with the present invention;

FIG. 2 represents voltage and temperature responses during overcharge of a lithium-ion cell made in accordance with the present invention;

FIG. 3 represents repeated overcharge/overdischarge characteristics of a lithium-ion cell made in accordance with the present invention; and FIG. 4 is a schematic representation of a lithium-ion cell embodying a carbon substrate based anode in accordance with the present invention.

DESCRIPTION OF THE PREFERRED EMBODIMENTS

In a preferred form of the present invention, the lithium-ion battery is comprised of negative electrodes of either carbon-carbon composite or carbon coated on carbon-based substrates and positive electrodes containing $LiCoO_2$, $LiNiO_2$, $LiNiCoO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, $Li_2ZrN_2$ or combinations of these materials. The carbon-carbon composite itself is also used as the substrate for the negative electrode.

The electrolyte used in the lithium-ion battery of the present invention is a non-aqueous aprotic organic electrolyte and preferably a non-aqueous solution consisting of a solute, such as $LiPF_6$, $LiBF_4$, $LiAsF_6$, $LiCF_3SO_3$, $LiN(CF_3SO_2)_2$ or $LiClO_4$, dissolved in a solvent such as propylene carbonate, ethylene carbonate, diethyl carbonate, dimethyl carbonate, ethyl methyl carbonate and dimethoxy ethane as well as mixtures thereof.

There are a number of known approaches suitable for producing carbon-carbon composite material, which are described e.g. in the following review Books: Essentials of Carbon-Carbon Composites, Edited by C. R. Thomas, The Royal Society of Chemistry, Cambridge, 1993 and Carbon-Carbon Composites, by G Savage, Chapman & Hall, New York, 1993. The disclosures of such review books are incorporated herein by reference. The present invention is not limited to any specific approach to produce carbon-carbon composite. According to the present invention, the anode and substrate can be formed of carbon-carbon composite material. Alternatively, the anode can be formed of carbon material on a substrate formed of carbon based material. For example, commercially available conductive carbon film can be used as substrate for the negative electrode on which high lithium-ion intercalation capacity carbon is coated to produce the negative electrode.

A preferred form of lithium-ion cell embodying a carbon-carbon composite anode or carbon material coated on carbon film to make the anode is shown in FIG. 4. When a mass of single phase carbon-carbon composite forms both the anode and substrate, the thickness of the mass of carbon-carbon composite is sufficient to enable the carbon-carbon composite to function both an anode (in terms of its electrochemical reaction capability) and as a substrate (in terms of its electron transfer capability). Wherein the assembled cell 101 is shown with the anode, cathode, and electrolyte enclosed in a sealed sandwich structure with the carbon anode electrically accessible by means of protruding nickel conductive tab 102 and the lithiated intercalation compound cathode electrically accessible by means of a protruding conductive aluminum tab 103. The anode (not shown) and cathode (not shown) of the assembled cell 101 are separated by a porous separator (not shown) that is permeated with an aprotic non-aqueous electrolyte (not shown) that is in effective contact with both the anode and cathode.

In FIG. 4, above the assembled cell 101, there is also shown the components of the cell 101, comprised of a pair of one-sided cathodes 104A and 104B and a carbon anode 105, suitable to be assembled as a sandwich (cell 101) with the anode 105 positioned between the respective cathodes 104A and 104B being separated from the anode 105 by respective porous separators 106A and 106B that are permeated with an aprotic, non-aqueous electrolyte that is in effective contact with both the cathode and the facing anodes.

Conductive aluminum tabs 103A and 103B are provided for the respective cathodes 104A and 104B and a nickel conductive tab 102A is provided for the anode 105, whereby the respective electrodes of the cell 101 are electrically accessible when assembled as a sandwich and enclosed within a sealed enclosure.

The materials of the respective anodes and cathodes of the cell 101 may be formed of materials, as described herein in further detail. For examples, as described above, the anode may be carbon-carbon composite. The cathode may be formed of $LiCoO_2$, $LiNiO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, $Li_2ZrN_2$ or a combination thereof, supported by an aluminum foil substrate. The respective anode and cathode electrodes are maintained spaced from one another by a respective electrically non-conductive separator that is permeable whereby the aprotic, non-aqueous electrolyte is carried by the spacers and maintained in effective electrochemical contact with both the cathode and facing anode. The permeable separator may be formed of a micro-porous poly-olefin film.

It is to be understood that a plurality of electrochemical cells as described above can be used to assemble a battery of such cells by connecting the respective electrodes of the assembly of cells in an electrical circuit and in a known fashion to produce a battery with the voltage or current characteristics as determined by the number of cells connected in series or parallel circuit relationship.

The following specific examples are given to illustrate the practice of the invention, but are not to be considered as limiting in any way.

EXAMPLES 1

Commercially available carbon conductive film (COER-X from REXAM) was used as a substrate for anode of a lithium-ion cell to evaluate the concept of the present invention. The anode was made from a mixture of 90% MCMB 2528 graphite and 10% PVDF in DMF by coating on to the carbon film. The lithium-ion cell included the negative electrode, a lithiated cobalt dioxide positive electrode and 1M $LiPF_6$ electrolyte in a mixture (1:1 v/v) of ethylene carbonate/dimethyl carbonate (EC/DMC) solvents. A micro-porous poly-olefin (Celgard 2400) separator was used in between the positive and negative electrodes to isolate them electronically. The positive electrode was made from a mixture of 85% $LiCoO_2$, 6% carbon black and 9% PVDF in DMF by coating on to an aluminum foil.

The aprotic, non-aqueous 1M $LiPF_6$ electrolyte mixture permeated the micro-porous poly-olefin separator, whereby the electrolyte was in effective contact with both the positive and negative electrodes, which were nevertheless maintained space and electrically isolated from one another.

The developed cell was charged at a constant current of 30 mA to 4.1 V and then at a constant voltage (4.1 V) for 3 hours or until the current dropped to 2 mA. The cell was then discharged at a constant current of 30 mA to a cut-off voltage of 3.0 V. The charge discharge process was repeated at least three times in order to obtain a stable charge discharge capacity. The cell was then exposed to repeated overdischarges. FIG. 1 represents a plot of repeated overdischarge. The cell was discharged at a constant current of 30 mA to −1.0 V. For the first two cycles, the cell was charged to 4.1

V and for the last two cycles, the charge voltage was 4.2 V. The capacities delivered during overdischarges are 180 mAh, 179 mAh, 193 mAh, and 193 mAh for the 1 to 4 cycles, respectively. The cell did not show any performance degradation.

EXAMPLES 2

A lithium-ion cell was made as in Example 1 with the carbon-carbon composite heat treated to 2800° C. as anode, lithiated cobalt oxide as active cathode material and an electrolyte comprising 1 M $LiPF_6$ in a mixture of ethylene carbonate and diethyl carbonate (1:1 v/v). The cell was first charged at a constant current of 0.5 $mA/cm^2$ to 4.1 V and then at a constant voltage (4.1 V) for a period of three hours or until the current dropped to 0.02 $mA/cm^2$. The cell was then discharged at a constant current of 0.5 $mA/cm^2$ to a cut-off voltage of 3.0 V. The charge-discharge process was repeated at least two times in order to obtain a cycling efficiency greater than 99%. The cell was then used to carry out the overcharge experiment.

The voltage and temperature response of a fully charged cell during overcharge at two different rates is shown in FIG. 2. The temperature recorded was the outside body temperature of the cell. At 1C charge rate, the cell voltage raised to 4.7 V maximum with insignificant increase in temperature.

EXAMPLES 3

A lithium-ion cell was made as in Example 1 with the carbon-carbon composite heat treated to 2600° C. as anode, lithiated cobalt oxide as active cathode material and an electrolyte comprising 1 M $LiPF_6$ in a mixture of ethylene carbonate and diethyl carbonate (1:1 v/v). The cell was first charged at a constant current of 0.5 $mA/cm^2$ to 4.1 V and then at a constant voltage (4.1 V) for a period of three hours or until the current dropped to 0.02 $mA/cm^2$. The cell was then discharged at a constant current of 0.5 $mA/cm^2$ to a cut-off voltage of 3.0 V. The charge-discharge process was repeated at least two times in order to obtain a cycling efficiency greater than 99%. The cell was then used to carry out repeated overcharge/overdischarge experiment.

FIG. 3 shows the repeated overcharge-overdischarge characteristics at 50 mA of the lithium-ion cell made in accordance with the present invention. There was no safety hazard or thermal run away of the cell. The cell can accept repeated overcharge and overdischarge and still deliver excellent capacity.

What is claimed is:

1. A rechargeable electrochemical cell consisting essentially of a body of aprotic, non-aqueous electrolyte, and first and second electrodes in effective contact with said electrolyte; the first electrode comprising a lithiated intercalation compound, and the second electrode consisting essentially of carbon-based material disposed on a substrate comprising carbon-based material.

2. A rechargeable electrochemical cell as defined in claim 1, wherein said substrate comprises a carbon-carbon composite material.

3. A rechargeable electrochemical cell consisting essentially of a body of aprotic, non-aqueous electrolyte, and first and second electrodes in effective contact with said electrolyte; the first electrode comprising a lithiated intercalation compound, and the second electrode consisting essentially of a mass of carbon-carbon material having a thickness sufficient to enable the mass of carbon-carbon material to function both as an anode (in terms of its electrochemical reaction capability) and as a substrate (in terms of its electron transfer capability); whereby during normal charge/discharge and overdischarge, the substrate part of the second electrode behaves as a substrate but during overcharge it allows for lithium-ions intercalation, thereby providing the cell with overdischarge and overcharge acceptance.

* * * * *